(12) United States Patent
Sitton et al.

(10) Patent No.: US 8,462,589 B2
(45) Date of Patent: Jun. 11, 2013

(54) APPARATUS FOR GENERATING SEISMIC SIGNALS HAVING DISTINGUISHING SIGNATURES

(75) Inventors: Gary A. Sitton, Houston, TX (US); Robert Bloor, Missouri City, TX (US); J. MacDonald Smith, Houston, TX (US)

(73) Assignee: Inova Ltd., George Town, Grand Cayman (KY)

( * ) Notice: Subject to any disclaimer, the term of this patent is extended or adjusted under 35 U.S.C. 154(b) by 351 days.

(21) Appl. No.: 12/645,835

(22) Filed: Dec. 23, 2009

(65) Prior Publication Data

US 2010/0149922 A1   Jun. 17, 2010

Related U.S. Application Data

(62) Division of application No. 11/856,386, filed on Sep. 17, 2007, now Pat. No. 7,639,567.

(51) Int. Cl.
   *G01V 1/04*   (2006.01)

(52) U.S. Cl.
   USPC ............................................ 367/189; 181/113

(58) Field of Classification Search
   USPC ................ 367/39, 41, 42, 189; 181/113, 121
   See application file for complete search history.

(56) References Cited

U.S. PATENT DOCUMENTS

| | | | |
|---|---|---|---|
| 3,795,286 A | 3/1974 | Meyer | |
| 3,881,167 A | 4/1975 | Pelton et al. | |
| 3,885,225 A | 5/1975 | Anstey et al. | |
| 4,295,213 A * | 10/1981 | Mifsud | 367/41 |
| 4,715,020 A | 12/1987 | Landrum | |
| 4,718,049 A | 1/1988 | Crowell et al. | |
| 4,823,326 A | 4/1989 | Ward | |
| 5,080,189 A | 1/1992 | Cole | |
| 5,128,908 A | 7/1992 | Reust | |
| 5,241,513 A | 8/1993 | Kerekes et al. | |
| 5,412,623 A | 5/1995 | Asada et al. | |
| 5,550,786 A | 8/1996 | Allen | |
| 5,646,380 A | 7/1997 | Vaage | |

(Continued)

FOREIGN PATENT DOCUMENTS

| | | |
|---|---|---|
| CN | 1989660 A | 6/2007 |
| EA | 007911 B1 | 2/2007 |

(Continued)

OTHER PUBLICATIONS

International Search Report and Written Opinion for PCT/US2008/010800, dated Dec. 9, 2008.

(Continued)

*Primary Examiner* — Ian Lobo
(74) *Attorney, Agent, or Firm* — Dorsey & Whitney LLP

(57) ABSTRACT

A seismic system has a plurality of seismic sources. Each of the seismic sources includes a reaction mass movable with respect to a geological structure and includes an actuator moving the reaction mass. The movement of the reaction mass emits a source signal as seismic energy into the geological structure. In the system, each of the source signals is generated from a base vibratory signal segmented into a plurality of segments, where the base vibratory signal sweeps from an initial frequency to a final frequency. Each of the segments has a partition of sweep frequencies different from the other segments. Each of the source signals has a distinguishing arrangement of the segments different from the other source signals.

32 Claims, 5 Drawing Sheets

U.S. PATENT DOCUMENTS

| | | | |
|---|---|---|---|
| 5,715,213 | A | 2/1998 | Allen |
| 5,721,710 | A | 2/1998 | Sallas et al. |
| 5,725,329 | A | 3/1998 | Chelminski |
| 5,790,473 | A | 8/1998 | Allen |
| 5,822,269 | A | 10/1998 | Allen |
| 6,188,962 | B1 | 2/2001 | Morgan et al. |
| 6,590,832 | B2 | 7/2003 | Dubois et al. |
| 6,687,619 | B2 | 2/2004 | Moerig et al. |
| 6,865,488 | B2 | 3/2005 | Moerig et al. |
| 7,859,945 | B2 | 12/2010 | Sallas et al. |
| 2006/0164916 | A1 | 7/2006 | Krohn et al. |

FOREIGN PATENT DOCUMENTS

| | | |
|---|---|---|
| EA | 008398 B1 | 4/2007 |
| RU | 2006882 C1 | 1/1994 |
| RU | 2159945 C1 | 11/2000 |
| RU | 2253136 C1 | 5/2005 |
| WO | 2004095073 A2 | 11/2004 |
| WO | 2005/019865 A2 | 3/2005 |

OTHER PUBLICATIONS

Office Action in co-pending U.S. Appl. No. 12/645,811, mailed Dec. 15, 2011.

Reply to Office Action in co-pending U.S. Appl. No. 12/645,811, filed Mar. 21, 2011.

Office Action in co-pending U.S. Appl. No. 12/645,818, mailed Dec. 2, 2011.

Reply to Office Action in co-pending U.S. Appl. No. 12/645,818, filed Mar. 21, 2011.

Office Action in co-pending U.S. Appl. No. 12/645,827, mailed Dec. 16, 2011.

Reply to Office Action in co-pending U.S. Appl. No. 12/645,827, filed Mar. 21, 2011.

Official Action in counterpart Russian Appl. No. 2010115265, dated Jun. 7, 2011.

Translation of Official Action in counterpart Russian Appl. No. 2010115265 of Jun. 7, 2011.

English Abstract of RU 2253136, obtained from www.espacnet.com., May 2005.

English Abstract of RU 2006882, obtained from www.espacnet.com., Jan. 1994.

English Abstract of RU 2159945, obtained from www.espacnet.com, Nov. 2000.

* cited by examiner

APPARATUS FOR GENERATING SEISMIC SIGNALS HAVING DISTINGUISHING SIGNATURES

CROSS-REFERENCE TO RELATED APPLICATIONS

This is divisional of U.S. patent application Ser. No. 11/856,386, filed Sep. 17, 2007, which is incorporated herein by reference in its entirety and to which priority is claimed.

BACKGROUND

1. Technical Field

The present disclosure generally relates to seismic prospecting and in particular to methods and apparatus for acquiring and processing geophysical information.

2. Background Information

In the oil and gas exploration industry, geophysical tools and techniques are commonly employed in order to identify a subterranean structure having potential hydrocarbon deposits. Seismic vibratory energy sources, or simply seismic vibrators, have been used in the field many years for generating source signals. A seismic vibrator in its simplest form is merely a heavy vehicle that has the ability to shake the ground at a predetermined range of frequencies to impart vibratory seismic signals into the subsurface of the earth over a specified period of time, which allows for an instantaneous energy level less than impulsive generators such as dynamite.

The imparted energy, termed "seismic source signals" herein, travels through the subsurface and reflects some of the energy from subsurface geological structures or layers. The reflected energy is then transmitted back to the earth's surface where it is recorded using an earth motion detector. The recorded data is processed and interpreted to yield information about location and physical properties of subsurface structures and layers.

The seismic source signal is typically a sweep signal, or simply sweep. Sweeps are sinusoidal vibrations and may have duration times on the order of about 5 to longer than 20 seconds depending on the terrain, the subsurface lithology, economic constraints and physical capabilities of the vibrator. The sinusoidal sweep can be increased in frequency overtime, which is called an "upsweep." The upsweep is the signal used typically in modern seismic exploration. Also, the sinusoidal sweep can be decreased in frequency overtime, which is called a "downsweep." The end products of the vibrator sweep are waves that propagate through the earth to return information about the subsurface.

The seismic waves travel through the ground and reflect off subterranean formations. Boundaries between formations of differing material, density or structure often reflect seismic waves, and seismic information relating to these waves is collected, processed interpreted to generate a representation or "pictures" of the subsurface. Any number of exploration systems may be used to gather the desired information for processing. Receiver sensors such as velocity geophones, accelerometers and/or hydrophones may be laid out in lines, or optionally towed in the case of hydrophones, for measuring the amplitude of seismic waves due to the seismic source, reflected off subsurface boundaries, and then returning to the deployed sensors. Multiple source point acquisition surveys provide a method of reducing the time to acquire a complete survey area of data. Traditional single source point acquisition acquires one source point of data at an exclusive time. Multiple source point acquisition is used to acquire many source points of data at an exclusive time, providing for faster acquisition of the data over traditional single source methods. In order to separate each source form an acquired multiple source record, contemporary multiple source methods employ methods that emit longer signals or increase the number of vibratory signals emitted in comparison to the tradition single source emission.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is a method and apparatus for generating a seismic source signal. In one aspect, a method includes generating energy in the form of a plurality vibratory signals being time sequence signals partitioned as a function of time, wherein each of the plurality of vibratory signals comprises a distinguishing signature. The vibratory signals are emitted into a terrain of interest as seismic source signals.

In another aspect, a method for geophysical information acquisition includes positioning a plurality of seismic receivers in a terrain of interest and receiving a plurality of seismic source signals with the plurality of seismic receivers, the seismic source signals being time sequence signals partitioned as a function of time and/or frequency, wherein each of the plurality of seismic source signals comprises a distinguishing signature.

In another aspect, a method for processing geophysical information includes receiving recorded seismic information, the recorded seismic information including a plurality of seismic signals, the seismic signals being time sequence signals partitioned as a function of time and/or frequency, wherein each of the plurality of signals comprises a distinguishing signature. The method further includes processing the seismic information to separate the seismic information with respect to each of the plurality of signals.

An apparatus according to one aspect includes a baseplate that is coupled to a surface of the earth, a reaction mass that is moved with respect to the baseplate, and a feedback-controlled actuator coupled to the reaction mass, the feedback controlled actuator providing a force to the reaction mass that induces linear movement of the reaction mass, the linear movement of the reaction mass causing seismic energy propagation into the earth, wherein the seismic energy is in the form of a plurality of time sequence seismic signals, the seismic signals being partitioned as a function of time, wherein each of the plurality of seismic signals comprises a distinguishing signature.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Figure 1:
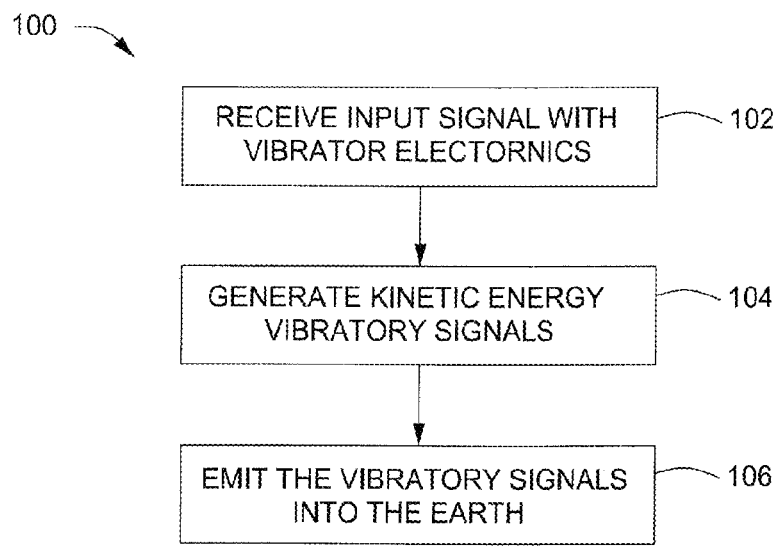
FIG. 1 illustrates a non-limiting example of a method for generating and propagating seismic energy into the earth.

The present disclosure uses terms, the meaning of which terms will aid in providing an understanding of the discussion herein. For example, the term information processing device as used herein means any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

Geophysical information as used herein means information relating to the location, shape, extent, depth, content, type, properties of and/or number of geologic bodies. Geophysical information includes, but is not necessarily limited to marine, transition zone, ocean bottom cable and land seismic information. Seismic information as used herein includes, but is not limited to, one or more or any combination of the following, analog signals, digital signals, recorded data, data structures, database information, parameters relating to surface geology, source type, source location, receiver location, receiver type, time of source activation, source duration, source frequency, energy amplitude, energy phase, energy frequency, wave acceleration, wave velocity and/or wave direction.

Geophysical information may be used for many purposes. In some cases, geophysical information such as seismic information may be used to generate an image of subterranean structures. Imaging, as used herein includes any representation of a subsurface structure including, but not limited to, graphical representations, mathematical or numerical representation, strip charts or any other process output representative of the subsurface structure.

The term "reaction mass" is used herein in conjunction with a seismic vibrator. Land seismic vibrators according to the disclosure may use a heavy weighted structure that reciprocates to impart controlled energy into the earth. This heavy weighted structure is generically termed a "reaction mass" herein. A "reaction mass" may move relative to other vibrator structures, such as a baseplate.

Disclosed is a simultaneous or asynchronous seismic vibrator multiple sourcing apparatus and method that operates in an acquisition time frame significantly shorter than current seismic vibrator multiple sourcing methods. Vibration duration using the disclosed methods and apparatus are comparable to conventional seismic vibrator single source duration, while providing data separation comparable or superior to current multiple source techniques, by emitting a set of low distortion time sequences that are uniquely partitioned in frequency and/or phase as a function of time such that each source within the set emits a distinct signature. The new partitioning methods disclosed will allow approximately the same sweep times (6-12 seconds) and sweep effort as conventional single source point acquisition. Time efficiency advantages will be realized by the disclosed methods using single source protocols or using multi-source protocols.

FIG. 1 illustrates a non-limiting example of a method for generating separable seismic source signals. In general, the method 100 includes receiving an input signal at a seismic vibrator 102, generating energy in the form of a plurality of time sequence vibratory signals 104, and emitting the vibratory signals into a terrain of interest 106 as seismic source signals.

The "input signals" in several non-limiting embodiments are the desired signal forms for a particular seismic survey. In an ideal case, the seismic source signal traveling in earth is identical to the input signal. The input signals may be created off site of the survey location or the input signals may be generated at the survey location. Once generated, the input signals are loaded onto the vibrator or vibrators for use by the vibrator electronics, e.g. the controller, to control the vibrator system. The vibrator system converts the input signals to kinetic energy in the vibrator reaction mass. The energy in the vibrator system reaction mass will be referred to herein ss the vibratory signal.

In several non-limiting embodiments, several seismic vibrators are positioned on or near the terrain of interest. The individual seismic vibrators may be of any type seismic vibrator that is capable of controlling distortion to a level that enables signature separation during processing in field units or in a seismic information processing facility. Suitable non-limiting vibrators may include a hydraulic actuator system having a feedback control circuit for controlling harmonic distortion. One example of such a vibrator is disclosed in U.S. patent application Ser. No. 11/691,925 for "Apparatus and Method for Generating a Seismic Source Signal," the entire specification of which is hereby incorporated herein by reference. Other non-limiting examples of suitable vibrators include seismic vibrators having controlled linear electric motor actuators. Some examples of which are described below.

Variations in the allowable distortion level of generated signals may be accommodated by separation processing methods where the emitted signal signatures are distinct enough for recognition within the band of distortion. In general, the term "low distortion" as used herein relates to total harmonic distortion (THD). THD adds risk to the ability to separate recorded information, and the acceptable level of THD may vary and may depend on one or more factors. Some factors that may allow for higher or lower acceptable THD include the particular seismic record, recording methods used, filtering methods used, subtraction methods used and information processing methods. Therefore, the term "low distortion: should be considered herein as meaning an acceptable level of THD. In most cases, a THD of less than about 5% will be acceptable. In some embodiments, acceptable THD may be 5% or more. Source separation in any particular seismic information acquisition operation will be a function of the source geometry, signal strength, and uncorrected vibrator distortion.

In several embodiments, the input signals are frequency partitioned with respect to time in order to form input signals having distinct signatures. In another embodiment, the input signals are phase partitioned with respect to time in order to form signals having distinct signatures. In other non-limiting embodiments, the input signals may be partitioned by a combination of frequency and phase with respect to time.

Several seismic vibrators may be operated to emit respective partitioned vibratory signals as seismic source signals closely matching respective input signals at the about the same time or in a substantially simultaneous manner. In another embodiment, the partitioned vibratory signals may be emitted as seismic source signals in a partially overlapping manner with respect to time. Alternatively, the partitioned vibratory signals may be emitted asynchronously in series.

Figure 2A:
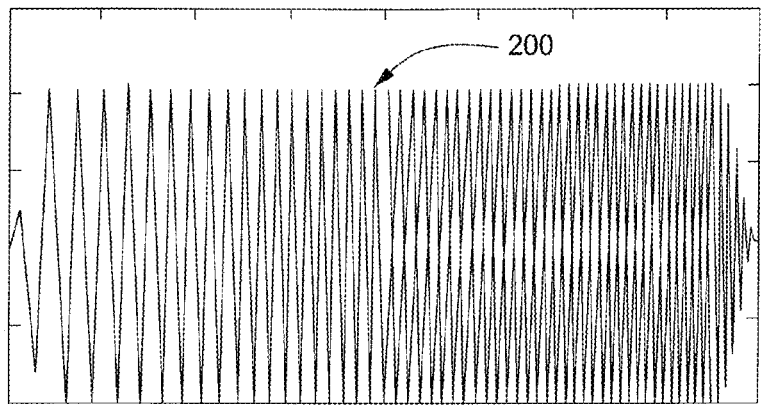
FIGS. 2A-2C illustrate a non-limiting example of generating a vibrator system input signal having a unique signature.
Figure 2B:
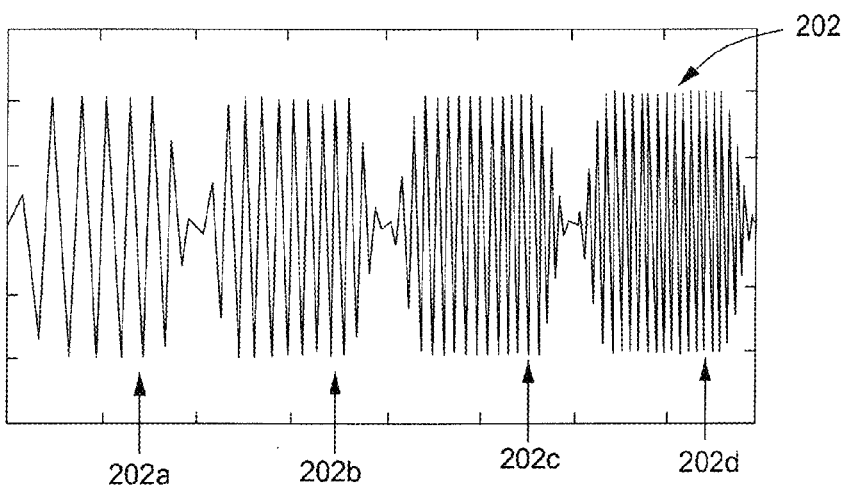
Figure 2C:
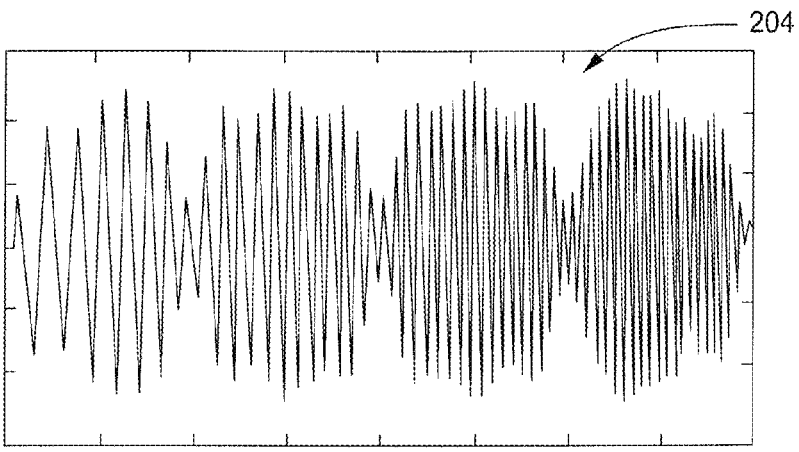

FIGS. 2A-2C and FIGS. 3A-3C illustrate a non-limiting method of generating input signals having a unique signal signature. Those skilled in the art will recognize that depicting actual signals using graphically unscaled data would not be practical. Thus, the figures are scaled and shifted for simplicity to illustrate the concept. FIG. 2A shows a base signal 200 having amplitude (vertical axis) scaled to ±1. The horizontal axis illustrates 4000 data points within a sweep of 5 to 25 Hz. In FIG. 2B, the base signal is segmented using a tapering process performed by a sweep synthesizer program or other signal generating program. Here, the base signal is shown segmented into four segments 202a, 202b, 202c and 202d, but more or less than four segments may be used. Note that each segment has a unique frequency characteristic. Phase characteristics of several source signals will be described later with reference to FIGS. 3A-D. The segments of the signal 202 are then spectrally compensated using the program to arrive at the input signal having unique signal signature 204.

Figure 3B:
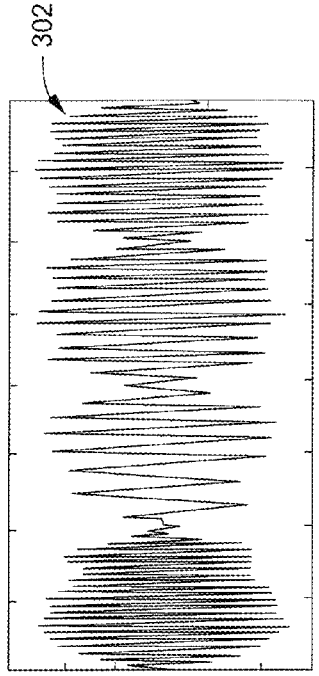
FIGS. 3A-3D illustrate a non-limiting example of a method for generating unique input signals for a four-source seismic source signal generating scheme where each input signal has a unique signature.
Figure 3D:
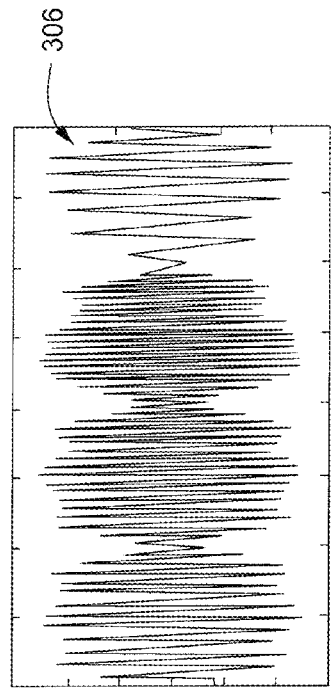
Figure 3A:
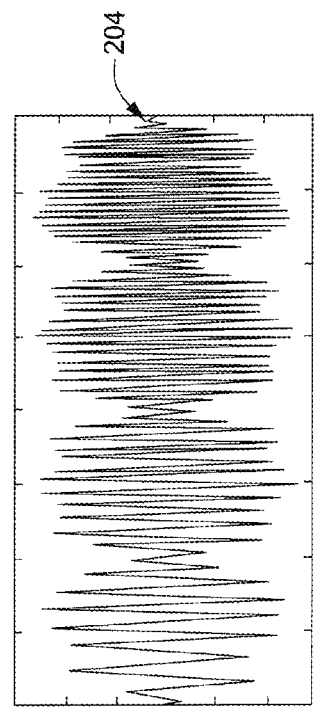
Figure 3C:
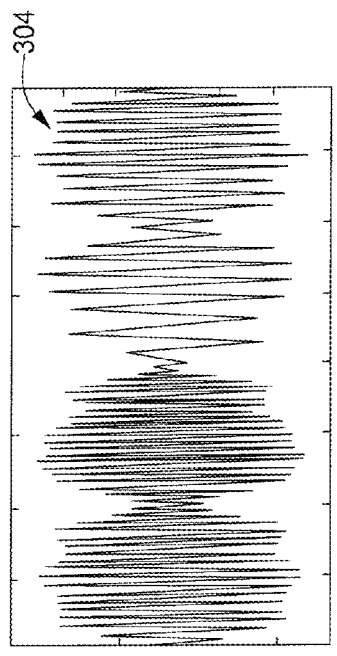

In one non-limiting embodiment, a seismic information acquisition operation is performed by conducting a seismic survey using four seismic sources where each source emits a partitioned vibratory signal into the earth as a seismic source signal having a unique vibratory signal signature closely matching the respective input signal. The seismic information acquired using seismic sensors may then be separated relative to the several source signals using information processing methods that separate the information based in part on the signal signatures. In the four-source example, the respective input signals may be partitioned as shown in FIGS. 3A-3D, although other signatures are within the scope of the disclosure. Here, FIG. 3A shows an input signal 204 having a signature as described above and shown in FIG. 2C. FIG. 3B illustrates an input signal 302 used by a second vibrator where the second vibrator input signal 302 has a signature unique with respect to the signal 204 loaded in the first vibrator. Likewise, FIGS. 3C and 3D illustrate respective unique input signals 304, 306 loaded into the electronics of the respective vibrators and that are unique with respect to the other emitted signals 204, 302. Each unique signature input signal may be generated by a circulatory time shift of signals using the segmenting and compensating process discussed above with respect to a base signal 200.

Figure 4:
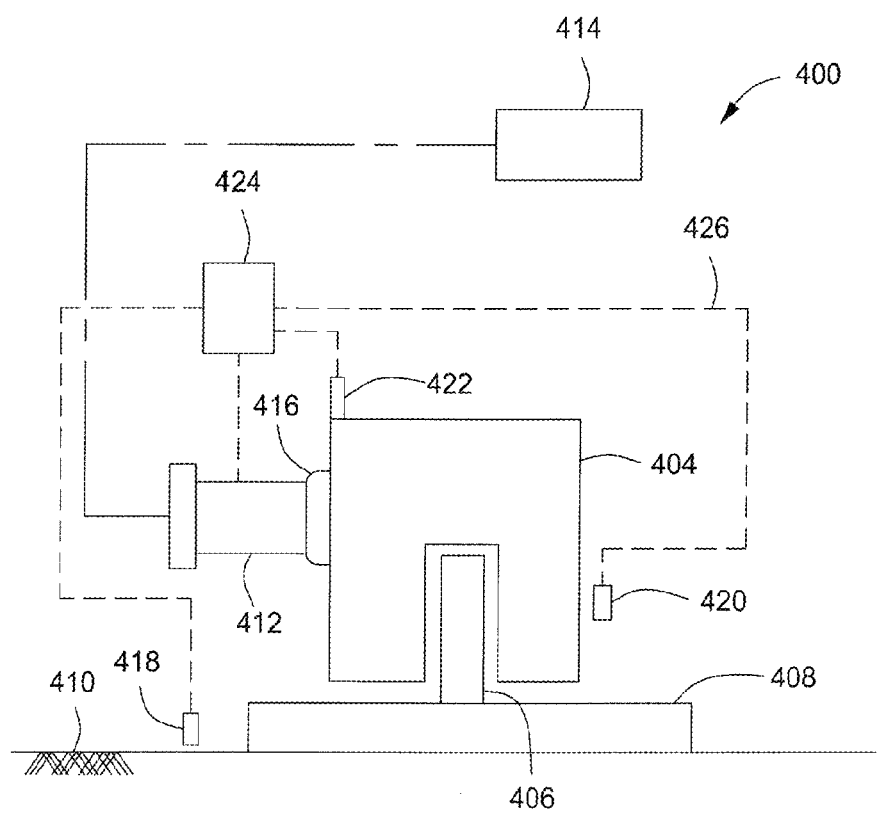
FIG. 4 schematically illustrates a non-limiting example of a land seismic vibrator system for generating and propagating compressional wave energy into the earth.

FIG. 4 schematically illustrates a non-limiting example of a land seismic vibrator system 400 for generating and propagating seismic energy signal into the earth in the form of a time sequence seismic source signal that is partitioned as a function of time, wherein the signal comprises a distinguishing signature as discussed above and shown in FIGS. 2C and 3A. The seismic vibrator system 400 includes a reaction mass 404 and a support member 406 mechanically coupled to a baseplate 408. The baseplate 408 maintains physical contact with the earth's surface 410 during operation. The seismic vibrator system 400 includes an electric power generator 414 that provides electrical power to an electric driver 412. A driver interface 416 provides mechanical, electrical or magnetic communication between the electric driver 412 and the reaction mass 404. The electric driver 412 in response to the input signal causes the reaction mass 404 to reciprocate along one or more axes during operation, thereby converting the input signal to kinetic energy in the reaction mass 404. The kinetic energy is in the form of a vibratory signal that closely matches the input signal.

The seismic vibrator system 400 may further include a controller 424 for controlling the electric driver 412 and movement of the reaction mass 404. Sensors 418, 420, 422 may be used to monitor operating parameters of the system 400. In one embodiment, an output signal from the sensors 418, 420, 422 may be incorporated into a feedback control circuit 426 for providing control of the reaction mass 404 movement and thus better control of the system 400 output energy imparted into the earth to control and maintain distortion levels to an acceptable THD.

The electric power generator 414 may be any suitable system that generates sufficient power for the seismic vibrator system 400. The electric power generator 414 may include any suitable device or combination of devices for supplying electrical power to the seismic vibrator system 400, including, but not limited to a gasoline engine, a diesel engine, and propane or natural gas powered generators. In one embodiment, the electric power generator 414 can be an industrial or commercial electrical supply network. In one embodiment, the electric generator can be a 250 kW three phase generator driven with a 300 to 400 HP power unit. In several embodiments, the electric power generator 414 provides electric power to the electric driver 412.

The electric driver 412 may include any number of drive types suitable for moving a heavy mass, such as the reaction mass 404. The electric driver 412 converts the electrical energy supplied by the electric power generator 414 to mechanical or magnetic energy sufficient to reciprocate the reaction mass 404. In one embodiment, the electric driver 412 includes rotary electric motor or several rotary electric motors. In one example, a "squirrel-cage" type motor may be used. In one embodiment, the electric driver 412 includes a linear electric motor or several linear electric motors. In some cases, a stator is rigidly coupled to a reaction mass 404 support structure and one or more armatures may be rigidly attached to the reaction mass 404. In other examples, a stator is rigidly coupled to a reaction mass 404 and one or more armatures may be rigidly attached to a support structure. In several embodiments, the electric driver 412 may include electromagnetic devices disposed on or about the reaction mass 404.

Continuing with the example of FIG. 4, the driver interface 416 may include any number of devices or structures suitable for interfacing the electric driver 412 to the reaction mass 404. The driver interface 416 may include a gearbox for converting energy from the electric driver 412 reciprocating motion in the reaction mass 404. In one embodiment, the electric driver 412 includes a linear induction motor, and the driver interface 416 can be an electromagnetic interface. In several embodiments, the energy to reciprocate the reaction mass 404 can be supplied using one or more electromagnetic devices disposed internal to the reaction mass 404. In one or more embodiments, the energy to reciprocate the reaction mass 404 can be supplied using one or more electromagnetic devices disposed external to the reaction mass 404.

The reaction mass 404 can be a structure fabricated from any resilient metallic material, such as steel, steel alloys, or any suitable composite material. The reaction mass 404 may be formed of a monolithic member or may include several members suitably coupled to form a reaction mass 404. The weight of the reaction mass 404 and the weight of the baseplate 408 may be selected according to any suitable ratio. The reaction mass 404 can be equipped with an internal cooling system, external cooling system, or any combination thereof, to maintain the electrical or electromagnetic driver 412 at a suitable operating temperature ranging from about 0° C. to about 150° C. In some embodiments, the weight of the reaction mass may be selected to be a minimum of twice the weight of the baseplate 408. The reaction mass 404 can weigh from about 2,000 lbs to about 15,000 lbs, about 4,000 lbs to about 13,000 lbs, or about 6,000 lbs to about 12,000 lbs., or about 15,000 lbs. to about 40,000 lbs.

The reaction mass 404 according to the example of FIG. 4 can be moved along on a vertical axis to generate the vibratory signal according to the input signal used. Movement of the reaction mass 404 in this manner imparts a force to the support member 406 once per cycle using the driver 412 and driver interface 416. The support member 406 can be rigidly attached to the baseplate 408 to permit transfer of the kinetic energy from the reaction mass 404 to the baseplate 408 via the support member 406. The support members 406 may be fabricated from any resilient metallic material, such as steel, steel alloys, or any suitable composite material capable of withstanding the force imparted from the reaction mass 404 and transferring the kinetic energy from the reaction mass 404 to the baseplate 408. The support member 406 can be rigidly affixed to the baseplate 408 using any suitable mechanical attachment including welding, bolting, pinning, or the like. In some cases, isolators such as air bags are used to isolate the baseplate 408 from vibrations caused by vibrator truck systems and motors.

In this manner, substantially all of the energy imparted to the baseplate is that of the reciprocating reaction mass 404.

The baseplate 408 can be fabricated from any resilient metallic material, such as steel, steel alloys, or any suitable composite material capable of supporting the weight of the reaction mass 404. In one embodiment the weight of the baseplate is approximately one-half the weight of the reaction mass 404. In one or more embodiments, the weight of the baseplate can range from about 1,000 lbs to about 8,000 lbs, about 2,000 lbs to about 6,000 lbs, or about 3,000 lbs to about 6,000 lbs.

In one embodiment, the baseplate 408 can be lowered from the transporter and placed into contact with the earth's surface 410 using either a hydraulically or electrically actuated lift system. The lift system can be configured such that the entire weight of the transporter rests upon the baseplate 408, thereby typically providing 60,000 pounds of down force to maintain contact between the baseplate 408 and the earth's surface while the seismic vibrator system 100 is in operation. Additional external weight can be added, if necessary, to ensure contact between the baseplate 408 and the earth's surface 410 is maintained at all times while the seismic vibrator system is in operation.

In one embodiment, one or more sensors 418, 420, 422 can be located on or in close proximity to the seismic vibrator system 400 to provide real time monitoring of system performance. In one embodiment, the one or more particle motion sensors 418 can include, but are not limited to single or multiple axis accelerometers, or geophones mounted proximately to the system 400 to monitor ground movement imparted to the surface of the earth 410 by the system 400. In one embodiment the one or more particle motion sensors 420 can include, but are not limited to micro electromechanical systems (MEMS) sensors, analog accelerometers with suitable A/D conversion and/or vibration sensors mounted on the system 400. In one embodiment, the one or more displacement sensors 422 can include laser, inductive and/or other types of proximity sensors to measure the displacement of the reaction mass 404 relative to the baseplate 408.

The sensors 418, 420, 422 can be used to provide signal inputs to the controller 424. In one embodiment, the controller 424 can be used to provide adjustments to operating variables such as stroke, acceleration, and frequency of the seismic vibrator system 400 in response system parameters monitored using the sensors 418, 420, 422. In one embodiment, pulse width modulation can be used to adjust the current supplied to the driver 412 to optimize system performance based upon sub-surface conditions. Control adjustments may be made in real time using feedback obtained during vibrator 400 operation.

The reaction mass 404 can reciprocate during operation along a vertical axis normal to the surface of the earth 408. A reciprocating cycle can begin with the reaction mass in physical contact with the support member 406, and the reaction mass 404 may be raised approximately 2" to 6" (5 cm to 15 cm) above the support member 406. At the top of a stroke, the reaction mass 404 is accelerated downward using gravity, electrical energy, mechanical energy, or any combination thereof and then up again in a reciprocating motion that imparts energy to the support member 406. The reciprocating motion transfers kinetic energy from the reaction mass 404, through the support member 406 to the baseplate 408. The energy imparted to the baseplate 408 by the reaction mass 404 establishes a compressional seismic wave ("P-Wave") which propagates into and through the surface of the earth 410. The time required for the reaction mass 404 to travel through one complete oscillatory cycle ("cycle time") determines the frequency of the seismic waves generated by the seismic vibrator system 400. In one or more embodiments, the cycle time for the reaction mass 404 can be varied from about 2 to about 300 cycles per second (Hertz).

The electrical power used to reciprocate the reaction mass 404 may be based upon the desired frequency and amplitude of the seismic waves imparted to the earth's surface. In one illustrative example, with a reaction mass of 8,000 pounds (2985 kg), a frequency of 25 hertz (i.e. 25 cycles per second), a displacement of approximately 4 inches (11 cm), and 2 G of acceleration at the point where the reaction mass 404 imparts a force to the support member 406, a minimum energy input of about 270 kW may be used for moving the reaction mass 404. In this illustrative example, the reciprocation of the reaction mass 404 will impart a series of seismic waves into the earth's surface 410, each containing approximately 5,400 foot-pounds (7,000 joules) of energy.

Figure 5:
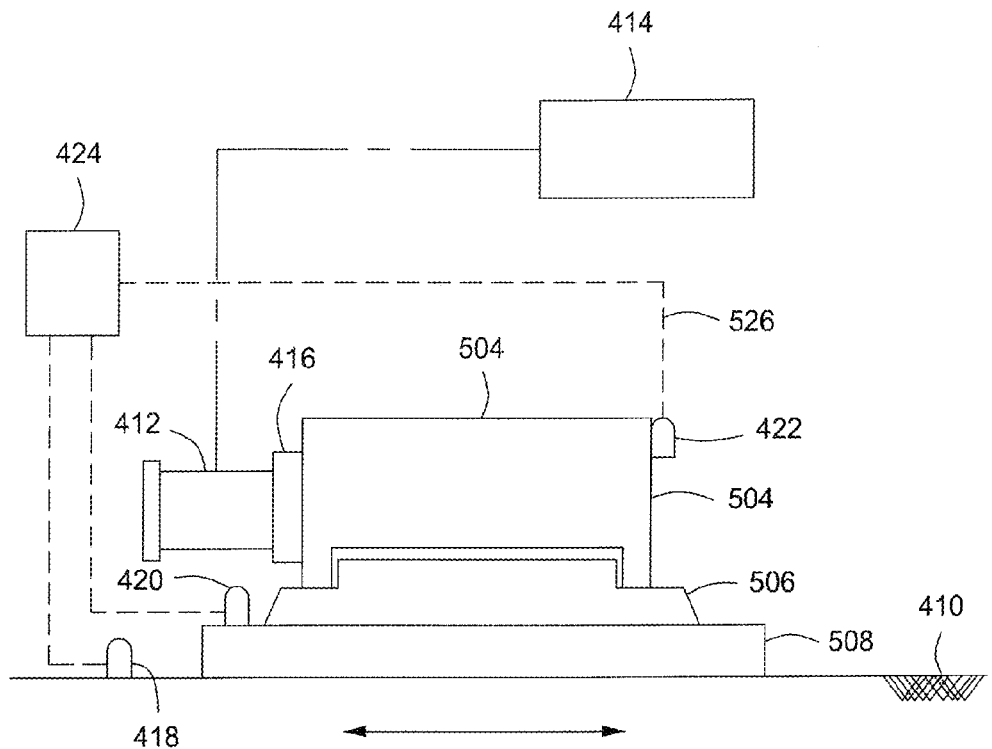
FIG. 5 is another schematic illustration of a non-limiting land seismic vibrator system for generating and propagating transverse wave energy into the earth's surface.

FIG. 5 is another non-limiting example of a seismic vibrator system 500 for generating and propagating seismic energy into the earth's surface. Seismic shear waves ("S-Waves") can be introduced into the earth's surface using the seismic vibrator system 500 shown. Similar to FIG. 4, the seismic vibrator system 500 can include a reaction mass 504 and support member 506 mechanically coupled to a baseplate 508. The baseplate 508 maintains physical contact with the earth's surface 410 during operation. The seismic vibrator system 500 includes an electric power generator 414 that provides electrical power to the driver 412. A driver interface 416 provides mechanical, electrical or electromagnetic communication between the driver 412 and the reaction mass 504. The electric driver 412 causes the reaction mass 504 to reciprocate along one or more axes during operation. Similar to the system depicted in FIG. 4, the seismic vibrator system 500 may further include a controller 424 for controlling the electric driver 412 and movement of the reaction mass 504. Sensors 418, 420, 422 can be incorporated into a feedback control circuit providing control of the reaction mass 504 movement and thus enhanced control of the system 500 seismic output.

Similar to FIG. 4, the system depicted in FIG. 5 can include an electric generator 414, in one example a 250 kW, 3 phase generate driven by a 300 to 400 HP power unit, for supplying electrical power to the electric driver 412. Also similar to FIG. 4, the driver 412 can include, but are not limited to, rotary electric motors, linear electric motors, electromagnetic devices, or any combination thereof disposed on or about the reaction mass 504. The system depicted in FIG. 5 can include a driver interface 416 including but not limited to mechanical Similar to FIG. 4, the reaction mass 504 can be fabricated from steel, steel alloys, stainless steel, stainless steel alloys or other metallic composites. In one embodiment, the reaction mass 504 can be fabricated using one or more composite materials. In one embodiment, the reaction mass 504 can be solid member. In one embodiment, the reaction mass 504 can have one or more inductive or magnetic devices disposed within or about the reaction mass 504. In one embodiment, the weight of the reaction mass 504 can be a minimum of twice the weight of the baseplate 508. In one embodiment, the reaction mass 504 can weigh from about 2,000 lbs to about 15,000 lbs, about 4,000 lbs to about 13,000 lbs, or about 6,000 lbs to about 12,000 lbs.

In one embodiment, the reaction mass 504 can be reciprocated on a horizontal axis (i.e. along an axis parallel to the surface of the earth), imparting a force to the opposing side of the support member 506 once per cycle, thereby imparting a lateral motion to the baseplate 508. The support member 506 can be rigidly attached to the baseplate 508 to permit the transfer of kinetic energy from the reaction mass 504 to the baseplate 508 via the support member 506. In one embodiment, the support member 506 can be fabricated from any resilient metallic material, such as steel, steel alloys, or any suitable composite material capable of withstanding the force imparted to the reaction mass 504 and transferring the kinetic energy from the reaction mass 504 to the baseplate 508. The reaction mass 504 can be equipped with an internal cooling system, external cooling system, or any combination thereof, to maintain the electrical or electromagnetic driver 512 at a suitable operating temperature ranging from about 0° C. to about 150° C. In one embodiment, the support member 506 can be rigidly affixed to the baseplate 508 using any means of mechanical attachment including welding, bolting, pinning, or the like. In one embodiment, the support member 506 can be fabricated integrally with the baseplate 508.

The baseplate 508 can be fabricated from any resilient metallic material, such as steel, steel alloys, or any suitable composite material capable of withstanding the energy transferred from the reaction mass 504. In one embodiment the weight of the baseplate 508 can be approximately one-half the weight of the reaction mass 504. In several embodiments, the weight of the baseplate 508 can range from about 1,000 lbs to about 8,000 lbs, about 2,000 lbs to about 6,000 lbs, or about 3,000 lbs to about 6,000 lbs.

In one embodiment, the baseplate 508 can be lowered from the transporter and placed into contact with the earth's surface 410 using either a hydraulically or electrically actuated lift system. The lift system can be configured such that the entire weight of the transporter rests upon the baseplate 508, thereby typically providing 60,000 pounds of down force to maintain contact between the baseplate 408 and the earth's surface while the seismic vibrator system 500 is in operation. Additional external weight can be added, if necessary, to ensure contact between the baseplate 508 and the earth's surface 410 is maintained at all times while the seismic vibrator system is in operation.

The sensors 418, 420, 422 can be located on or in close proximity to the seismic vibrator system 500 to provide real time monitoring of system performance. In one embodiment, particle motion sensors 418 can include, but are not limited to single or multiple axis accelerometers, geophones, or similar devices, mounted proximately to the system 500 to monitor ground movement imparted by the system 500. In one embodiment, the particle motion sensors 420 can include, but are not limited to accelerometers and/or vibration sensors mounted on the system 500. In one embodiment, the displacement sensors 422 can include laser, inductive and/or other types of proximity sensors to measure the displacement of the reaction mass 504.

In one embodiment, the sensors 418, 420, 422 can be used to provide signal inputs to the feedback controller 424. In one embodiment, the feedback controller is used to provide adjustments to operating variables such as stroke, acceleration, and frequency of the seismic vibrator system 500 in response to sub-surface conditions. In one embodiment, pulse width modulation can be used to accurately adjust the current supplied to the driver 412 to optimize system performance based upon sub-surface conditions. Control adjustments may be made in real time using feedback obtained during vibrator 500 operation.

The electric driver 412 can be used to reciprocate via the driver interface 416 the reaction mass 504 on an axis parallel to the surface of the earth 410. In one or more embodiments, a reciprocating cycle can begin with the reaction mass in physical contact with the support member 506. The reaction mass 504 can be axially displaced approximately 2" to 6" (5 cm to 15 cm) in a first direction along a horizontal axis bringing the reaction mass 504 into physical contact with the support member 506. The reaction mass 504 can then be accelerated in a second direction, 180° opposed to the first direction, along the identical horizontal axis, until the reaction mass 504 once again contacts the support member 506.

The force of the reaction mass 504 can be transmitted through the support member 506 to the baseplate 508. Since the baseplate 508 contacts the earth's surface 410, the energy imparted to the baseplate establishes a shear or S-wave which propagates through the surface of the earth 410. The time required for the reaction mass 504 to travel through one complete reciprocating cycle ("cycle time") determines the frequency of the S-waves generated by the seismic vibrator system 500. In one or more embodiments, the cycle time can be varied from about 2 to about 300 cycles per second (Hertz).

Figure 6:
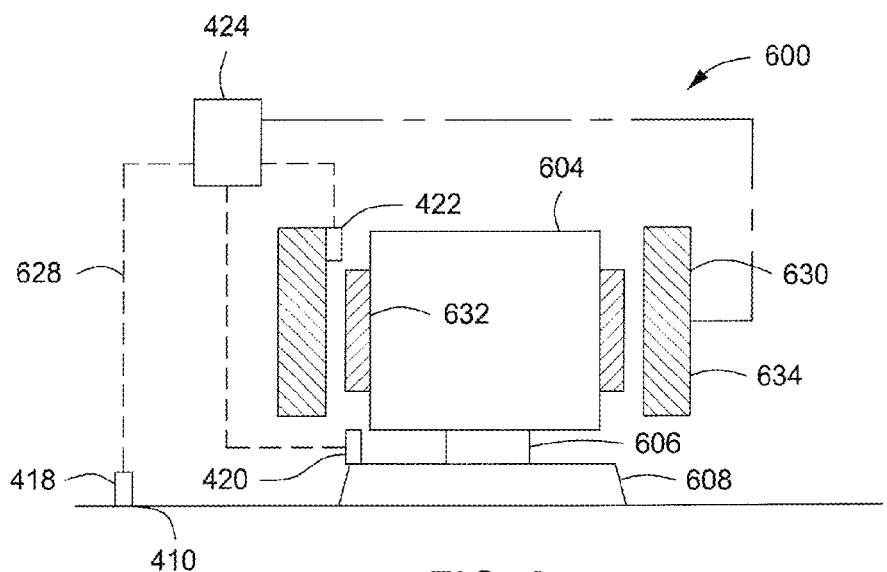
FIG. 6 illustrates an example of a land seismic vibrator system having a drive external to a reaction mass.

FIG. 6 illustrates another non-limiting example of an illustrative apparatus for generating geophysical information used in imaging earth subsurface structures. In one or more embodiments, the seismic vibrator system 600 includes a reaction mass 604, and a support member 606 mechanically connected or affixed to a baseplate 608. The baseplate 608 maintains contact with the surface of the earth 410 during operation. In one embodiment, the seismic vibrator system 600 can include a linear electric motor 630. In one embodiment, the one or more linear electric motors 630 can include one or more stators 634 coupled to a vibrator support structure and one or more armatures 632 coupled to the reaction mass 604. The positions of the stator(s) and rotor(s) may be reversed in other embodiments. In one embodiment, the seismic vibrator system 600 includes sensors 418, 420, 422 in communication with a controller 424. In one embodiment, the output from the controller 424 can be used to control the linear electric motor 630 thereby adjusting the seismic source signal generated by the seismic vibrator system 600.

In one embodiment, the linear electric motor 630 may include a linear induction motor ("LIM") to achieve high acceleration of the reaction mass 604. A LIM type design can have an active three-phase winding forming the one or more stators 334 and one or more passive conductor plates 632 in physical connection with, and affixed to, the reaction mass 604.

In one embodiment, the linear electric motor 630 may include a linear synchronous motor ("LSM") capable of achieving high speed and power at a lower acceleration than a comparable LIM. An LSM type design can have an active winding forming the one or more stators 634 and an array of alternate-pole magnets 632 in physical connection with, and affixed to, the reaction mass 604. With an LSM type design, the one or more magnets 632 can be either permanent magnets or electromagnets.

As depicted in FIG. 6, the reaction mass 604 can reciprocate along a vertical axis normal to the surface of the earth 410. Using the one or more linear electric motors 630, the reaction mass 604 can be raised approximately 2" to 6" (5 cm to 15 cm) above a neutral position and accelerated downward using either gravity, the linear electric motor, or any combination thereof and then up again in a reciprocating motion that imparts energy to the support member 606. The reciprocating motion transfers kinetic energy from the reaction mass 604, through the support member 606 to the baseplate 608. The energy imparted to the baseplate 608 from the reaction mass 604 establishes a compressional seismic wave ("P-Wave"), which propagates into the surface of the earth 410. The time required for the reaction mass 604 to travel through one complete reciprocating cycle ("cycle time") determines the frequency of the seismic waves generated by the seismic vibrator system 600. The cycle time for the reaction mass can be varied from about 2 to about 300 cycles per second (Hertz).

Sensors 418, 420, 422 can be located on or in close proximity to the seismic vibrator system 600 to provide real time monitoring of system performance. In one embodiment, particle motion sensors 418 placed near the system can include, but are not limited to single or multiple axis accelerometers, or geophones to monitor ground movement imparted by the system 600. In one embodiment particle motion sensors 420 coupled to the system 600 can include, but are not limited to accelerometers and/or vibration sensors to measure motion of the system components. In one embodiment the one or more particle motion sensors 420 can include, but are not limited to micro electromechanical systems (MEMS) sensors, analog accelerometers with suitable A/D conversion and/or vibration sensors mounted on the system 600. Displacement sensors 422 can be used to measure the displacement or position of the reaction mass 604 during operation and may include laser, inductive and/or other types of proximity sensors.

In one embodiment, the sensors 418, 420, 422 can be used to provide signal inputs to the controller 424 via a feedback circuit 326. In one embodiment, the feedback controller can provide one or more output signals to adjust operating variables such as stroke, acceleration, and frequency of the seismic vibrator system 600 in response to estimated operating parameters. In one embodiment, pulse width modulation can be used to adjust the current supplied to the driver 412 to optimize system performance based upon sub-surface conditions. Control adjustments may be made in real time using feedback obtained during operation of the seismic vibrator system 600.

Figure 7:
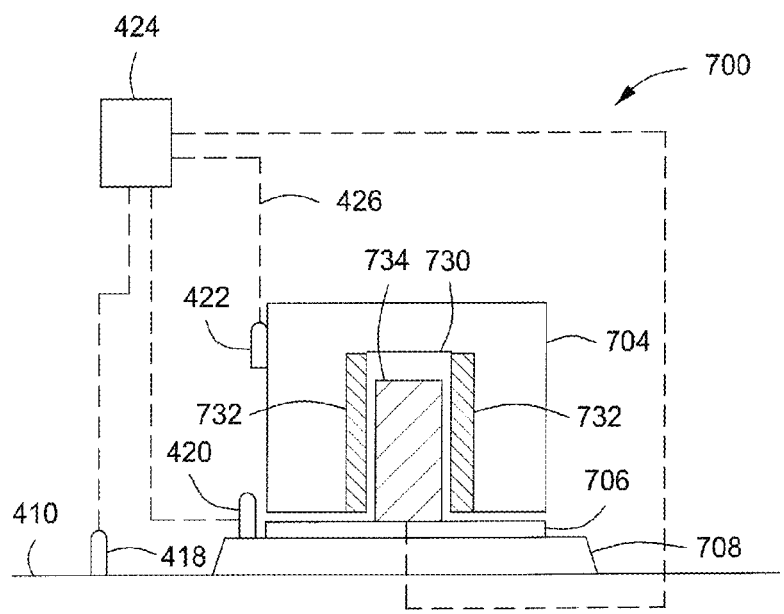
FIG. 7 illustrates an example of a land seismic vibrator system having a drive internal to a reaction mass.

FIG. 7 illustrates yet another non-limiting example of an illustrative apparatus for generating and propagating a seismic source signal into the earth. A seismic vibrator system 700 according to this example includes a reaction mass 704, and a support member 706 mechanically connected or affixed to a baseplate 708. The baseplate 708 maintains contact with the surface of the earth 410 during operation. In one or more embodiments, the seismic vibrator system 700 can include one or more linear electric motors 430. The linear electric motor 730 may include one or more stators 734 coupled to a vibrator support structure and one or more armatures 732 in physical connection with, and affixed to, the reaction mass 704. The positions of the stators and armatures may be reversed in other embodiments. The seismic vibrator system 700 can include one or more sensors 418, 420, 422 in communication with a controller 424. An output from the controller 424 may be used to control the electric motors 430 thereby adjusting the seismic source signal generated by the seismic vibrator system 700.

The linear electric motors 730 may include a linear induction motor ("LIM") or a linear synchronous motor ("LSM"). The linear electric motor 730 may be disposed internal to the reaction mass 704. In one embodiment, the one or more stators 734 can be rigidly attached to the support member 706 that is further coupled to the vibrator support structure, and the armatures 732 can be attached to the reaction mass 704; thereby permitting the inductive forces between the stator 734 and the armatures to vibrate the reaction mass 704 along a vertical axis.

The reciprocating motion of the reaction mass 704 transfers kinetic energy from the reaction mass 704 through the support member 706 (when used) to the baseplate 708. The energy transfer establishes a compressional seismic wave ("P-Wave") which propagates into the surface of the earth 410. The time required for the reaction mass 704 to travel through one complete cycle ("cycle time") determines the frequency of the seismic waves generated by the seismic vibrator system 700. In one or more embodiments, the cycle time for the reaction mass can be varied from about 2 to about 300 cycles per second (Hertz).

Sensors 418, 420, 422 can be located on or in close proximity to the seismic vibrator system 700 to provide real time monitoring of system performance. In one embodiment, particle motion sensors 418 can be placed on the ground proximate the system 700 to monitor ground movement imparted by the system 700. The ground sensors 418 may include, but are not limited to single or multiple axis accelerometers, or geophones. Other particle motion sensors 420 may be coupled to the system 700 for estimating movement of vibrator components during operation. In one embodiment the one or more particle motion sensors 420 can include, but are not limited to micro electromechanical systems (MEMS) sensors, analog accelerometers with suitable A/D conversion and/or vibration sensors mounted on the system 700. Position sensors 422 may be used to estimate the position of the reaction mass 704 during operation. These In one embodiment, the sensors 418, 420, 422 can be used to provide signal inputs to the controller 424 via a feedback circuit 426. In one embodiment, the controller 424 can provide one or more output signals to adjust operating variables such as stroke, acceleration, and frequency of the seismic vibrator system 700 in response to sub-surface conditions. In one embodiment, pulse width modulation can be used to adjust the current supplied to a driver, such as the driver 412 discussed above and shown in FIG. 4, to optimize system performance based upon sub-surface conditions. Control adjustments may be made in real time using feedback obtained during operation of the seismic vibrator system 700.

In operation, methods according to the disclosure include generating a plurality of seismic source signals using several land seismic vibrators positioned on or near a terrain of interest. In reference to the several embodiments described above and shown in FIGS. 1-7, land seismic vibrators may be transported to a seismic survey area. A baseplate for each vibrator is then coupled to the earth's surface. In one embodiment, the transporter can be hydraulically or electrically lifted such that the weight of the transporter rests upon the baseplate. If necessary, additional external weight can be added to the transporter to ensure solid contact between the baseplate and the surface of the earth at all times while the vibrator is in operation. Safety sensors can be installed on the lift mechanism to warn of failure to lower the baseplate prior to operation or failure to raise the baseplate prior to moving the transporter. A reaction mass is moved in a reciprocating manner along one or more axes using a feedback-controlled electric linear motor or by a feedback-controlled hydraulic actuator. Kinetic energy from the reciprocating reaction mass is transferred to the baseplate, and a seismic source signal is propagated into the earth. Reciprocating the reaction may be accomplished using a feedback controlled linear induction motor or a linear synchronous motor or controlled hydraulic actuator as discussed above. When using electric motor embodiments, a drive interface may be used to convey energy from the electric motor to the reaction mass.

The actuator or motor and the motion of the reaction mass may be controlled using a controller to generate energy in the form of a plurality of time sequence vibratory signals, the vibratory signals being partitioned as a function of time, wherein each of the plurality of signals comprises a distinguishing signature, and operation parameters may be monitored according to several embodiments using sensors placed in, on or around each seismic vibrator. An output signal indicative of the estimated operating parameters may be conveyed to the controller via a feedback circuit, and the controller may be used to adjust acceleration, velocity, force, frequency, stroke or other parameters of the seismic vibrator in real-time during operation to reduce and control total harmonic distortion to about 5% or less THD. Pulse width modulation can be used to adjust the current flow to the seismic vibrator system in real-time to optimize system performance based upon observed sub-surface conditions.

Other embodiments include methods for acquiring seismic information and for processing seismic information. In one embodiment, a method for seismic information acquisition includes positioning a plurality of seismic receivers in a terrain of interest. The receivers are used to receive a plurality of time sequence vibratory signals that are generated as described above where the vibratory signals are partitioned as a function of time. Each signal includes a distinguishing signature that may be separated at the receiver, at a field processor or in a processing facility away from the terrain of interest.

In another embodiment, a method for processing seismic information includes receiving recorded seismic information. The recorded information is created by a seismic survey where a plurality of seismic vibrators generate signals as described above and which signals are received by seismic receivers and recorded on a recording medium. The recorded seismic information includes the time sequence vibratory signals generated at the vibrators and after the signals are emitted into the earth and have reflected off subterranean formations. The vibratory signals are partitioned as a function of time, wherein each of the plurality of signals comprises a distinguishing signature. The recorded seismic information is then processed to separate the seismic information with respect to each of the plurality of signals.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A seismic source, comprising:
   a reaction mass movable with respect to a geological structure;
   and an actuator moving the reaction mass, the movement of the reaction mass emitting a source signal as seismic energy into the geological structure,
   wherein the source signal is generated from a vibratory signal provided to the seismic source at a location, the vibratory signal including a plurality of segments of a base vibratory signal arranged together to generate the source signal, the base vibratory signal sweeping from an initial frequency to a final frequency, at least one of the plurality of segments having a partition of sweep frequencies different from at least one of the other segments, and
   wherein the vibratory signal has a distinguishing arrangement of the segments different from at least one other vibratory signal provided to another seismic source used in a seismic survey.

2. The source of claim 1, comprising a baseplate coupleable relative to the geological structure, wherein the reaction mass is movable with respect to the baseplate.

3. The source of claim 1, comprising a controller operatively coupled to the actuator and controlling the actuator based on feedback-control from one or more sensors.

4. The source of claim 1, wherein the seismic energy from the source signal has a total harmonic distortion of less than or equal to 5%.

5. The source of claim 1, wherein the actuator comprises an electric motor or a hydraulic system.

6. The source of claim 1, wherein the seismic energy comprises compressional waves or shear waves.

7. The source of claim 1, wherein the base signal comprises an upsweep or a downsweep signal.

8. The source of claim 1, wherein the seismic source is a land-based or a marine-based seismic source.

9. The source of claim 1, wherein the distinguishing arrangement enables the source signal to be separated from other source signals in the seismic energy when received at one or more receivers.

10. The source of claim 1, further comprising a processor operatively coupled to the source, the processor segmenting the base signal into the segments and arranging the segments into the distinguishing arrangement to generate the source signal.

11. The source of claim 10, wherein to segment the base signal, the processor performs a tapering process on the base signal using a signal generating program.

12. The source of claim 11, wherein to generate the source signal, the processor spectrally compensates the arranged segments using the signal generating program.

13. The source of claim 12, wherein to generate the source signal, the processor performs the tapering process and spectrally compensates the segments in a circulatory time shift pattern.

14. The source of claim 10, wherein to generate the source signal, the processor orders the segments in the distinguishing arrangement at a first point in time, provides a listening time after the distinguishing arrangement, and repeats the ordering of the distinguishing arrangement and providing of the listening time at subsequent points in time.

15. A seismic system, comprising:
a plurality of seismic sources, each respective seismic source comprising:
a reaction mass movable with respect to a geological structure; and
an actuator moving the reaction mass, the movement of the reaction mass emitting a respective source signal as seismic energy into the geological structure,
wherein each respective source signal is generated from a respective vibratory signal provided to one of the respective seismic sources at a respective location, each respective vibratory signal including a plurality of segments of a base vibratory signal arranged together to generate the respective source signal, the base vibratory signal sweeping from an initial frequency to a final frequency, at least one of the plurality of segments having a partition of sweep frequencies different from at least one of the other segments, and
wherein the respective vibratory signal has a distinguishing arrangement of the segments different from another vibratory signal provided to at least one of the other of the plurality of seismic sources.

16. The system of claim 15, wherein one or more of the seismic sources comprise a baseplate coupleable relative to the geological structure, wherein the reaction mass is movable with respect to the baseplate.

17. The system of claim 15, wherein one or more of the seismic sources comprise a controller operatively coupled to the actuator and controlling the actuator based on feedback-control from one or more sensors.

18. The system of claim 15, wherein the seismic energy from the source signals has a total harmonic distortion of less than or equal to 5%.

19. The system of claim 15, wherein one or more of the actuators comprise an electric motor or a hydraulic system.

20. The system of claim 15, wherein the seismic energy comprises compressional waves or shear waves.

21. The system of claim 15, wherein the base vibratory signal comprises an upsweep or a downsweep signal.

22. The system of claim 15, wherein the seismic sources are land-based or marine-based seismic sources.

23. The system of claim 15, further comprising a processor operatively coupled to the seismic sources, the processor segmenting the base vibratory signal into the segments and arranging the segments into the distinguishing arrangements to generate the source signals.

24. The system of claim 23, wherein to segment the base vibratory signal, the processor performs a tapering process on the base vibratory signal using a signal generating program.

25. The system of claim 24, wherein to generate the source signals, the processor spectrally compensates the arranged segments using the signal generating program.

26. The system of claim 25, wherein to generate the source signals, the processor performs the tapering process and spectrally compensates the segments in a circulatory time shift pattern.

27. The system of claim 23, wherein to generate the source signals, the processor orders the segments in the distinguishing arrangements at a first point in time, provides listening times after the distinguishing arrangements, and repeats the ordering of the distinguishing arrangements and providing of the listening times at subsequent points in time.

28. The system of claim 15, wherein the source signals are frequency partitioned, phase partitioned, or frequency and phase partitioned as a function of time.

29. The system of claim 15, wherein the source signals are emitted asynchronously, at least partially overlapping in time, or substantially simultaneously.

30. The system of claim 15, further comprising:
one or more receivers receiving the seismic energy from the source signals; and
a processing device operatively coupled to the one or more receivers and processing the seismic energy.

31. The system of claim 30, wherein to process the seismic energy, the processing device separates the source signals from one another in the seismic energy based on the distinguishing arrangements.

32. The system of claim 30, wherein to process the seismic energy, the processing device develops a representation of the geological structure.

* * * * *